(12) United States Patent
Ikeda

(10) Patent No.: US 10,232,445 B2
(45) Date of Patent: Mar. 19, 2019

(54) CUTTING INSERT, CUTTING TOOL, AND METHOD FOR MANUFACTURING MACHINED PRODUCT

(71) Applicant: KYOCERA CORPORATION, Kyoto (JP)

(72) Inventor: Yoshihito Ikeda, Ritto (JP)

(73) Assignee: KYOCERA CORPORATION, Kyoto (JP)

(*) Notice: Subject to any disclaimer, the term of this patent is extended or adjusted under 35 U.S.C. 154(b) by 183 days.

(21) Appl. No.: 15/121,375

(22) PCT Filed: Feb. 25, 2015

(86) PCT No.: PCT/JP2015/055354
§ 371 (c)(1),
(2) Date: Aug. 24, 2016

(87) PCT Pub. No.: WO2015/129730
PCT Pub. Date: Sep. 3, 2015

(65) Prior Publication Data
US 2016/0361767 A1 Dec. 15, 2016

(30) Foreign Application Priority Data
Feb. 26, 2014 (JP) ................................. 2014-034864

(51) Int. Cl.
*B23B 27/16* (2006.01)
*B23B 27/22* (2006.01)
*B23B 27/14* (2006.01)

(52) U.S. Cl.
CPC .......... *B23B 27/145* (2013.01); *B23B 27/141* (2013.01); *B23B 2200/0447* (2013.01);
(Continued)

(58) Field of Classification Search
CPC ...... B23B 2200/0447; B23B 2200/201; B23B 27/145; B23B 2200/286; B23B 27/141; B23B 2200/3654; B23B 2200/081
See application file for complete search history.

(56) References Cited

U.S. PATENT DOCUMENTS 5,456,557 A * 10/1995 Bernadic ............... B23B 27/143
407/114
5,771,763 A * 6/1998 Naslund ............... B23B 27/145
407/113
(Continued)

FOREIGN PATENT DOCUMENTS

| JP | H08-505817 A | 6/1996 |
|----|--------------|--------|
| JP | H11-197909 A | 7/1999 |
| JP | 201245634 A  | 3/2012 |

OTHER PUBLICATIONS

International Search Report in International Application No. PCT/JP2015/055354, dated Apr. 14, 2015, in 2 pages.
(Continued)

*Primary Examiner* — Sara Addisu
(74) *Attorney, Agent, or Firm* — Duane Morris LLP

(57) ABSTRACT

A cutting insert of one aspect is provided with a top surface having a polygonal shape and including a corner portion, a first side and a second side, each extending from the corner portion, a bottom surface, a side surface, and a cutting edge. The cutting edge includes a corner cutting edge disposed in a position corresponding to the corner portion, and a first cutting edge disposed in a position corresponding to the first side. The top surface includes an inclined surface provided with a first inclined surface disposed along the first side, a second inclined surface disposed along the second side, and a third inclined surface disposed along the corner portion.

(Continued)

An inclination angle of the first inclined surface is greater than an inclination angle of the second inclined surface.

14 Claims, 13 Drawing Sheets

(52) U.S. Cl.
CPC ... *B23B 2200/081* (2013.01); *B23B 2200/201* (2013.01); *B23B 2200/286* (2013.01); *B23B 2200/3654* (2013.01)

(56) References Cited

U.S. PATENT DOCUMENTS

| | | | |
|---|---|---|---|
| 5,810,521 A | 9/1998 | Pantzar et al. | |
| 7,008,148 B2* | 3/2006 | Wiman | B23B 27/141 |
| | | | 407/113 |
| 9,346,102 B2* | 5/2016 | Selin | B23B 27/005 |
| 2002/0127068 A1* | 9/2002 | Kinukawa | B23B 27/145 |
| | | | 407/113 |
| 2006/0188347 A1* | 8/2006 | Kratz | B23B 27/145 |
| | | | 407/113 |
| 2006/0228179 A1* | 10/2006 | Alm | B23B 27/145 |
| | | | 407/113 |
| 2013/0064613 A1* | 3/2013 | Krishtul | B23B 27/143 |
| | | | 407/114 |
| 2016/0243624 A1* | 8/2016 | Tomoda | B23B 27/143 |

OTHER PUBLICATIONS

Written Opinion in International Application No. PCT/JP2015/055354, dated Apr. 14, 2015, in 3 pages.

* cited by examiner

CUTTING INSERT, CUTTING TOOL, AND METHOD FOR MANUFACTURING MACHINED PRODUCT

TECHNICAL FIELD

The present embodiment relates to a cutting insert, a cutting tool, and a method for manufacturing a machined product.

BACKGROUND ART

Examples of known cutting tools used for carrying out cut processing on a work material such as a metal include a cutting insert described in Japanese Unexamined Patent Application Publication No. 2012-45634A (Patent Document 1), and a throw-away tip described in Japanese Unexamined Patent Application Publication No. H11-197909A (Patent Document 2). The tip described in Patent Document 2 includes a cutting edge having a linear shape and located near a top surface having a rhombic shape, and a nose cutting edge located in a corner portion of the top surface. Further, a rake angle of a section along the cutting edge of a rake face on the top surface is constant while a rake angle of a section along the nose cutting edge varies.

While the rake angle is increased in order to decrease a cutting resistance, a thickness of a tip (cutting insert) between side surfaces and the rake face decreases in such a case. Chips cut by a first cutting edge of a pair of cutting edges having a linear shape and sandwiching the nose cutting edge (corner cutting edge) pass over a rake face disposed along this first cutting edge, and then advance towards a second cutting edge of the pair of cutting edges having a linear shape.

The chips that have advanced towards the second cutting edge collide with a rake face disposed along the second cutting edge and curl. When the rake angle is large and the cutting insert is thin at this time, the collision of chips at a high feed rate or the like may cause the rake face disposed along the second cutting edge to wear and become damaged.

In light of the above-described problems, the present embodiment provides a cutting insert capable of decreasing damage to a rake face and carrying out favorable cut processing.

SUMMARY OF INVENTION

A cutting insert based on an aspect of the present invention includes a top surface having a polygonal shape and including a corner portion, a first side and a second side, each extending from the corner portion, a bottom surface, a side surface located between the top surface and the bottom surface, and a cutting edge disposed on a ridge where the top surface and the side surfaces intersect. The cutting edge includes a corner cutting edge disposed in a position corresponding to the ridge of the corner portion, and a first cutting edge disposed in a position corresponding to the first side. The top surface includes an inclined surface provided with a first inclined surface disposed along the first side, a second inclined surface disposed along the second side, and a third inclined surface disposed along the ridge of the corner portion. Then, an inclination angle of the first inclined surface is greater than an inclination angle of the second inclined surface.

DESCRIPTION OF EMBODIMENTS

Cutting Insert

Figure 1:
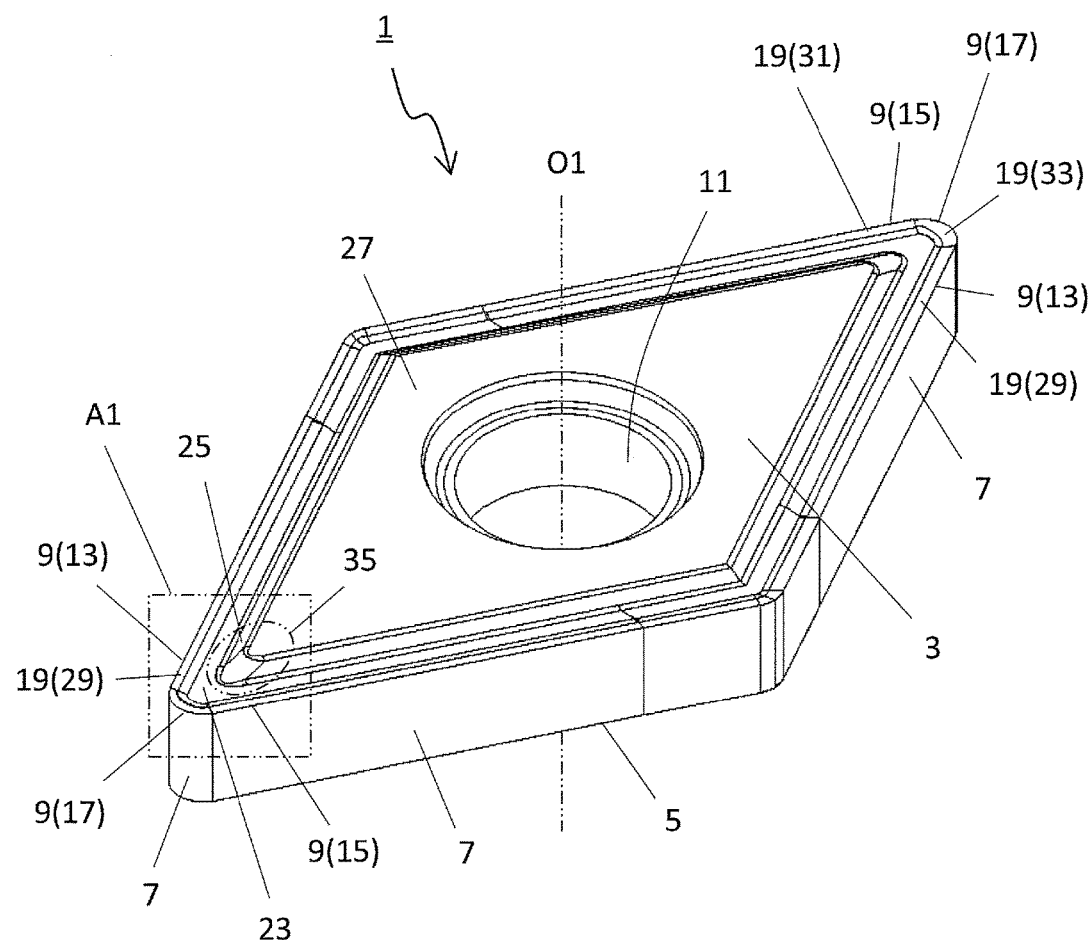
FIG. 1 is a perspective view illustrating a cutting insert of a first embodiment of the present invention.

The following describes in detail a cutting insert 1 of one embodiment using the drawings. However, for convenience of explanation, each of the drawings referenced below is simplified to illustrate only the main members necessary to illustrate the present invention out of the constituent members of the embodiments. Accordingly, the cutting insert of the present invention may be provided with any constituent member which is not illustrated in each of the referenced drawings. Further, the dimensions of the members in the drawings do not faithfully represent the actual dimensions of the constituent members, the dimension ratios of the members, or the like.

The cutting insert 1 (hereinafter also simply referred to as "insert 1") in the present embodiment includes, for example, a top surface 3, a bottom surface 5, side surfaces 7, cutting edges 9, and a through-hole 11, as illustrated in FIG. 1. Examples of the material of the insert 1 include cemented carbide alloy, cermet, or the like. Examples of the composition of the cemented carbide alloy include, for example, WC—Co, WC—TiC—Co, and WC—TiC—TaC—Co.

WC—Co is produced by adding a cobalt (Co) powder to tungsten carbide (WC), and sintering the mixture. WC—TiC—Co is formed by adding titanium carbide (TiC) to WC—Co. WC—TiC—TaC—Co is formed by adding tantalum carbide (TaC) to WC—TiC—Co.

Further, cermet is a sintered composite material obtained by combining a metal with a ceramic component. Specifically, examples of the cermet include titanium compounds in which titanium carbide (TiC) or titanium nitride (TiN) is the main component.

The surface of the insert 1 may be coated with a coating film using a chemical vapor deposition (CVD) method or a physical vapor deposition (PVD) method. Examples of the composition of the coating film include titanium carbide (TiC), titanium nitride (TiN), titanium carbonitride (TiCN), alumina ($Al_2O_3$), and the like.

The top surface 3 has a polygonal shape, and includes a corner portion 3c, a first side 3a, and a second side 3b, each extending from the corner portion 3c. The top surface 3 in the present embodiment has a substantially quadrilateral shape. Here, the polygonal shape does not strictly refer to a shape of a polygon. For example, the corner portion 3c of the top surface 3 in the present embodiment is not a strict corner, but rather a rounded shape in a top view of the insert 1.

Further, the first side 3a and the second side 3b that extend from the corner portion 3c are not necessarily strictly linear. For example, in a top view of the insert 1, each may have a shape that slightly protrudes towards an outer side.

The bottom surface 5 is a surface located on a side opposite the top surface 3, and functions as a seating face of an insert pocket when the insert 1 is attached to a holder. The bottom surface 5 in the present embodiment has the same shape as that of the top surface 3, and thus has a substantially quadrilateral shape similar to that of the top surface 3. While not particularly illustrated, an outer periphery of the bottom surface 5 overlaps with an outer periphery of the top surface 3 in a plane perspective.

Here, the shape of the top surface 3 and the bottom surface 5 is not limited to that in the embodiment described above. While the shape of the top surface 3 of the insert 1 in the present embodiment is substantially quadrilateral in a top view of the insert 1, the shape of the top surface 3 may be a polygonal shape such as a triangle, a pentagon, a hexagon, or an octagon in a top view of the insert 1. Further, while the top surface 3 in the present embodiment has a rhombic shape, the quadrilateral shape is not limited to such a shape, and the shape may be a parallelogram or a square, for example.

The side surfaces 7 are located between the top surface 3 and the bottom surface 5, and connected to the top surface 3 and the bottom surface 5. As described above, the bottom surface 5 and the top surface 3 have the same shape, and therefore the side surfaces 7 are orthogonal to the top surface 3 and the bottom surface 5. Further, in the present embodiment, the side surfaces 7 are each linear in a cross section parallel to a central axis O1 of the through-hole 11.

A maximum width when the top surface 3 of the insert 1 in the present embodiment is viewed directly from above is from 6 to 25 mm. In addition, a height from the bottom surface 5 to the top surface 3 is from 1 to 10 mm. Here, the height from the bottom surface 5 to the top surface 3 refers to a width between an upper end of the top surface 3 and a lower end of the bottom surface 5 in a direction parallel to the central axis O1.

The insert 1 of the present embodiment includes the through-hole 11 disposed from a center of the top surface 3 towards a center of the bottom surface 5. The through-hole 11 is provided for screw insertion when screw-fastening and securing the insert 1 to a holder of a cutting tool. The bottom surface 5 in the present embodiment is a flat surface, and a direction in which the central axis O1 of the through-hole 11 extends, in other words a through direction, is orthogonal to the bottom surface 5.

The cutting edges 9 are each disposed on a ridge where the top surface 3 and the side surfaces 7 intersect. The cutting edge 9 is used to cut a work material during cut processing. The cutting edge 9 in the present embodiment includes a first cutting edge 13 and a corner cutting edge 17. The corner cutting edge 17 is disposed in a position corresponding to the ridge of the corner portion 3c of the top surface 3. As described above, the corner portion 3c of the top surface 3 has a rounded shape in a top view of the insert 1. Thus, the corner cutting edge 17 has a rounded shape in a top view of the insert 1. Specifically, the corner cutting edge 17 has an arc shape protruding towards the outer side.

The cutting edge 9 in the present embodiment further includes a second cutting edge 15 in addition to the first cutting edge 13 and the corner cutting edge 17. The first cutting edge 13 is disposed in a position corresponding to the first side 3a. The second cutting edge 15 is disposed in a position corresponding to the second side 3b. That is, the first cutting edge 13 and the second cutting edge 15 each extend from the corner cutting edge 7. With the first cutting edge 13 and the second cutting edge 15 in the present embodiment disposed on the first side 3a and the second side 3b of the top surface 3, each have a linear shape in a top view of the insert 1.

Figure 2:
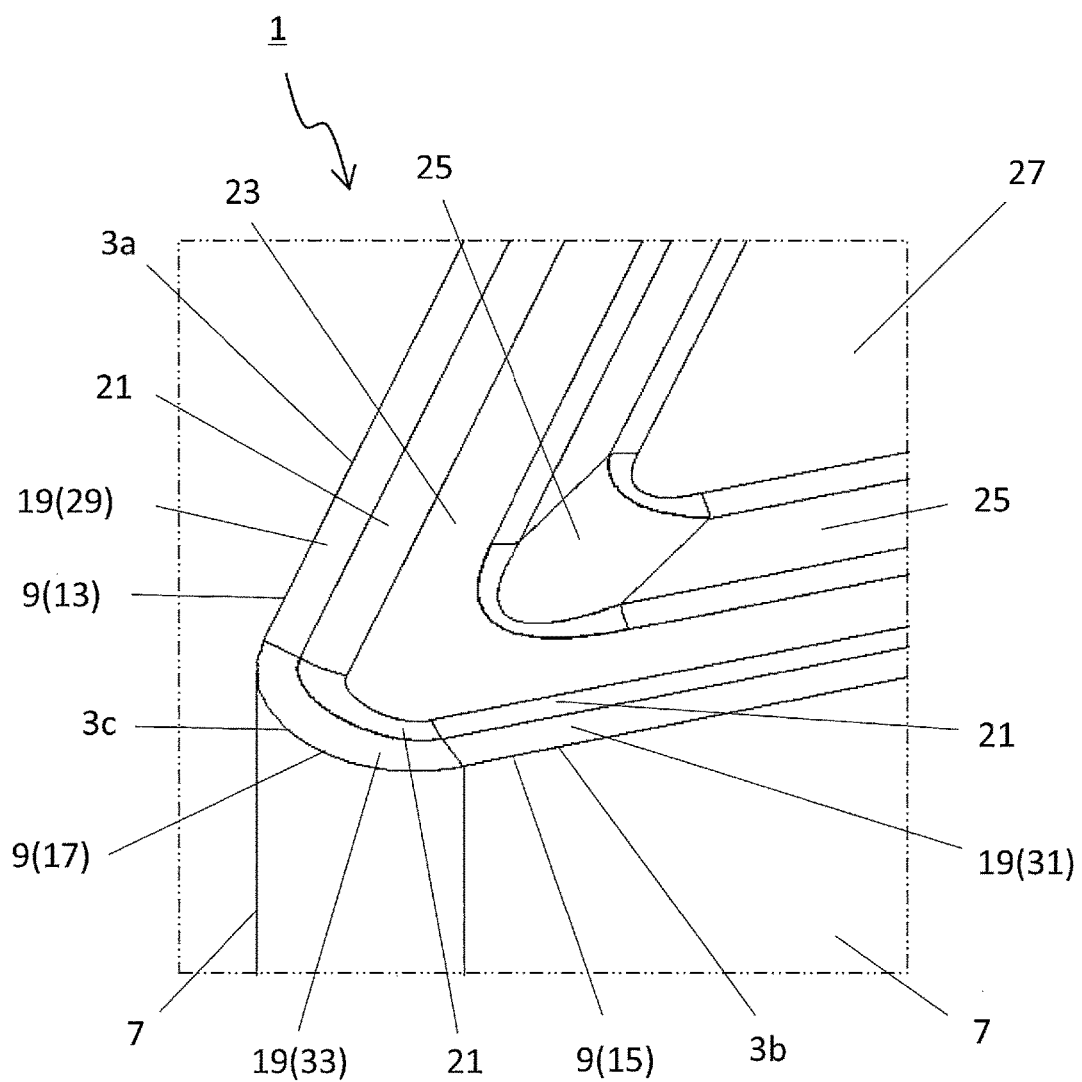
FIG. 2 is an enlarged perspective view of a region A1 of the cutting insert illustrated in FIG. 1.
Figure 3:
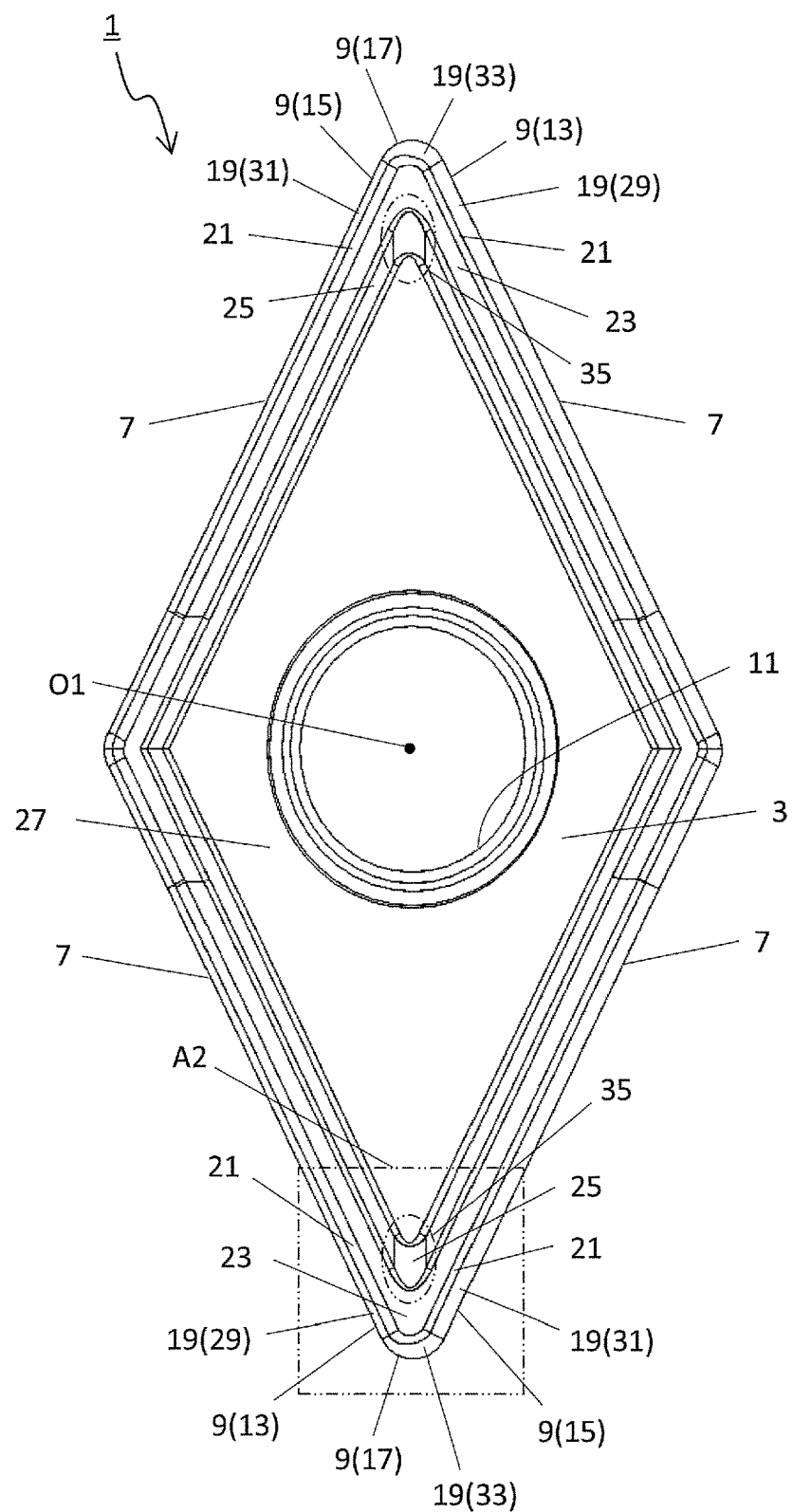
FIG. 3 is a top view of the cutting insert illustrated in FIG. 1.
Figure 4:
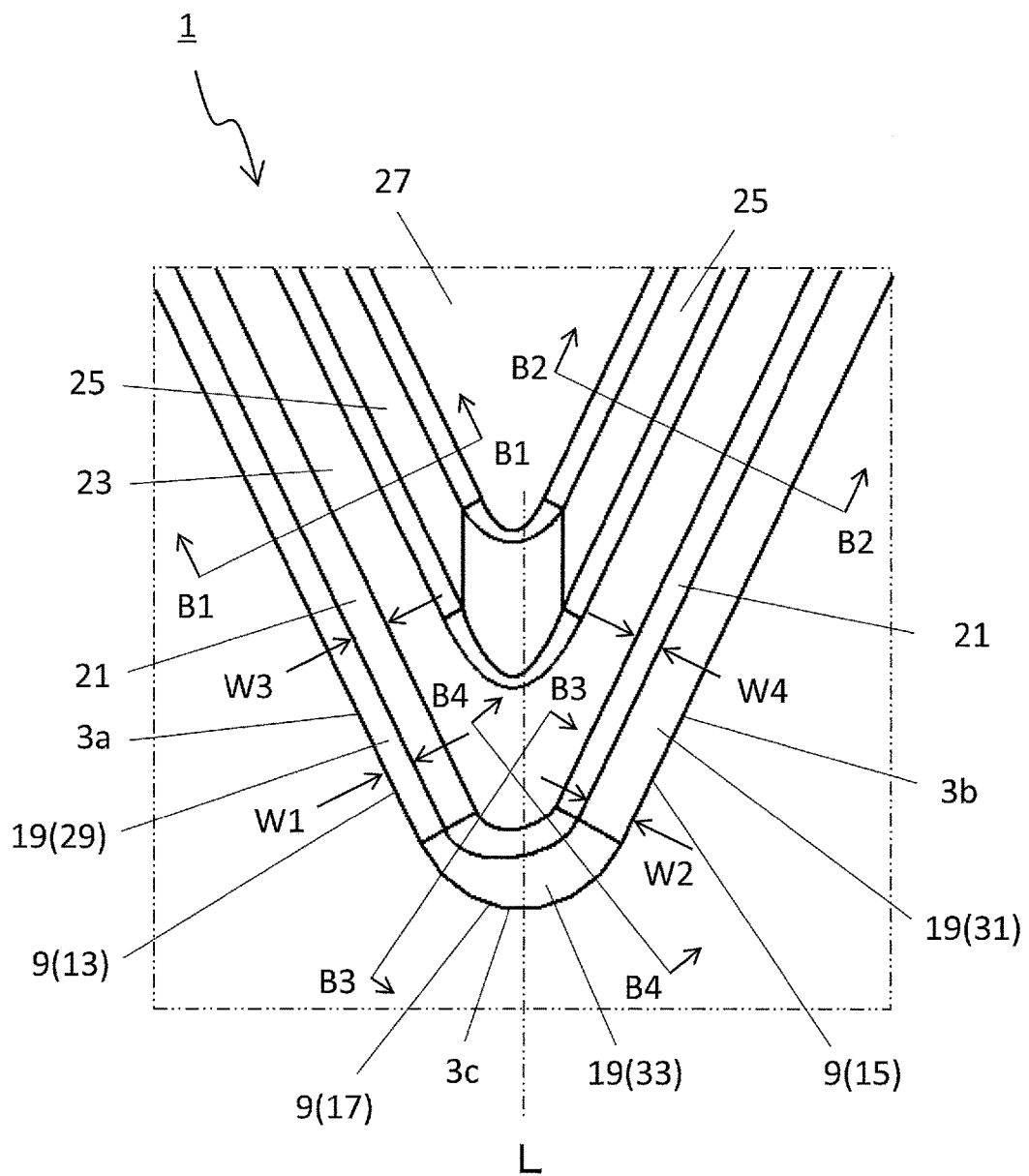
FIG. 4 is an enlarged top view of a region A2 of the cutting insert illustrated in FIG. 3.

Note that FIG. 2 is an enlarged perspective view of a region A1 of the cutting insert 1 illustrated in FIG. 1, and is an enlarged view of an area near the corner portion 3c of the top surface 3. Further, FIG. 4 is an enlarged perspective view of a region A2 of the cutting insert 1 illustrated in FIG. 3, and is an enlarged view of an area near the corner portion 3c of the top surface 3.

The bottom surface 5 in the present embodiment has the same shape as that of the top surface 3. Thus, while not particularly illustrated, a cutting edge is also disposed on the ridge where the bottom surface 5 and the side surfaces 7 of the present embodiment intersect. Specifically, a cutting edge corresponding to the corner cutting edge 17 is disposed in a position corresponding to the ridge of the corner portion of the bottom surface 5. Further, cutting edges corresponding to the first cutting edge 13 and the second cutting edge 15 are disposed on sides of the bottom surface 5.

A so-called honing process is carried out on each section that is a region where the top surface 3 and the side surface 7 intersect and in which the cutting edge 9 is disposed. That is, each of the ridges where the top surface 3 and the side surfaces 7 intersect does not have a strict linear shape by the intersection of the two surfaces. When the ridge described above has a linear shape, a strength of the cutting edge 9 decreases. Thus, in regions where the top surface 3 and the side surfaces 7 intersect, an R honing process that causes these regions to become curved is carried out.

The top surface 3 includes an inclined surface 19, a connecting surface 21, a flat surface 23, a rising surface 25, and a main surface 27. The inclined surface 19 is disposed along the cutting edge 9. The inclined surface 19 can fulfill such a role as scooping chips cut by the cutting edge 9, and in this case functions as a so-called rake face.

In the following, the inclined surface 19 is described as the rake face 19. The chips of the work material flow over a surface of the rake face 19. To ensure smooth chip flow, the rake face 19 inclines, and a height of the rake face 19 from the bottom surface 5 decreases as the rake face 19 separates from the cutting edge 9. In other words, in the insert 1 in the present embodiment, the rake face 19 inclines toward the bottom surface 5 as approaching the through-hole 11.

An inclination angle (rake angle), which is the angle representing this inclination, is indicated by an angle between the inclined surface and a virtual straight line parallel to the bottom surface 5 in a cross section orthogonal to the cutting edge 9. In the present embodiment, the rake face 19 has a linear shape in the cross section parallel to the central axis O1.

The inclined surface 19 (rake face 19) in the present embodiment is provided with a first inclined surface (first rake face) 29, a second inclined surface (second rake face) 31, and a third inclined surface (corner rake face) 33. The first rake face 29 is a region along the first cutting edge 13 of the overall rake face 19. Thus, the first rake face 29 is disposed along the first side 3a. The second rake face 31 is a region along the second cutting edge 15 of the overall rake face 19. Thus, the second rake face 31 is disposed along the second side 3b.

The first cutting edge 13 and the second cutting edge 15 have linear shapes, and therefore the first rake face 29 and the second rake face 31 are each a flat face in the present embodiment. Thus, as described above, the first rake face 29 and the second rake face 31 have linear shapes in the cross section parallel to the central axis O1.

The first rake face 29 and the second rake face 31 are each preferably a flat face in order to increase the strength of the rake face, but are not particularly limited to such a shape. For example, the first rake face 29 and the second rake face 31 may have concave curved surface shapes.

However, when the first rake face 29 and the second rake face 31 have concave curved surface shapes, the first rake face 29 and the second rake face 31 have curved shapes in the cross section parallel to the central axis O1. When the first rake face 29 and the second rake face 31 have concave curved surface shapes, tangents of upper ends of the first rake face 29 and the second rake face 31 are each established in the cross section orthogonal to the cutting edge 9. Then, inclination angles (rake angles) of the first rake face 29 and the second rake face 31 are each indicated by an angle between the tangent and the virtual straight line parallel to the bottom surface 5.

The corner rake face 33 is a region along the corner cutting edge 17 of the overall rake face 19. Thus, the corner rake face 33 is disposed along the ridge of the corner portion 3c. With the corner cutting edge 17 having an arc shape in a top view of the insert 1, the corner rake face 33 is a curved face and not a flat face. Specifically, the corner rake face 33 has a linear shape in the cross section parallel to the central axis O1 similar to the first rake face 29 and the second rake face 31, and a curved shape in the cross section orthogonal to the central axis O1.

Generally, rake angles of a pair of rake faces located along a pair of cutting edges having a linear shape and sandwiching a corner cutting edge are set to the same value to facilitate both right-hand use and left-hand use. Nevertheless, in the insert 1 of the present embodiment, these rake angles are not set to the same value, but rather a rake angle α1 of the first rake face 29 is greater than a rake angle α2 of the second rake face 31. In the insert 1 of the present embodiment, the rake angle α1 is set to 18° and the rake angle α2 is set to 13°, for example.

Because the rake angle α1 of the first rake face 29 is relatively large, it is possible to decrease a cutting resistance when carrying out cut processing using the first cutting edge 13. Additionally, with the rake angle α1 of the first rake face 29 being relatively large, chip processing can also be improved.

Further, because the rake angle α2 of the second rake face 31 is relatively small, a thickness of the cutting insert 1 between the second rake face 31 and the side surfaces 7 is large. Thus, even when the chips pass over the first rake face 29 and reach the second rake face 31, the chips are stably curled at the second rake face 31. In this way, the cut processing can be favorably carried out even during high feed processing at a high feed rate.

While the rake angle α1 of the first rake face 29 is constant in the insert 1 in the present embodiment, the rake angle α1 is not particularly limited to such an embodiment. For example, the rake angle α1 of the first rake face 29 may increase or decrease as going away from the corner rake face 33.

Similarly, while the rake angle α2 of the second rake face 31 is constant in the insert 1 in the present embodiment, the rake angle α2 is not particularly limited to such an embodiment. For example, the rake angle α2 of the second rake face 31 may increase or decrease as going away from the corner rake face 33 increases.

Note that, when the rake angles of the first rake face 29 and the second rake face 31 vary as described above, the rake angle of a region adjacent to the corner rake face 33 of the first rake face 29 and the rake angle of a region adjacent to the corner rake face 33 of the second rake face 31 should be compared.

In the insert 1 in the present embodiment, a width W2 of the second inclined surface 31 in a direction orthogonal to the second side 3b is greater than a width W1 of the first inclined surface 29 in a direction orthogonal to the first side 3a in a top view of the insert 1. In other words, the width W2 of the second inclined surface 31 in a direction orthogonal to the second cutting edge 15 is greater than the width W1 of the first inclined surface 29 in a direction orthogonal to the first cutting edge 13 in a top view of the insert 1.

With the inclination angle (rake angle) α1 of the first inclined surface (first rake face) 29 being greater than the inclination angle (rake angle) α2 of the second inclined surface (second rake face) 31, the strength of the first cutting edge 13 is less than the strength of the second cutting edge 15. Nevertheless, when the width W1 of the first inclined surface 29 in the direction orthogonal to the first cutting edge 13 is relatively small, it becomes less likely occur to an excessive decrease in the strength of the first cutting edge 13.

Further, when the width W2 of the second inclined surface 31 in the direction orthogonal to the second cutting edge 15 is relatively large, it is possible to widely secure a space for curling the chips on the second rake face 31.

Figure 7:
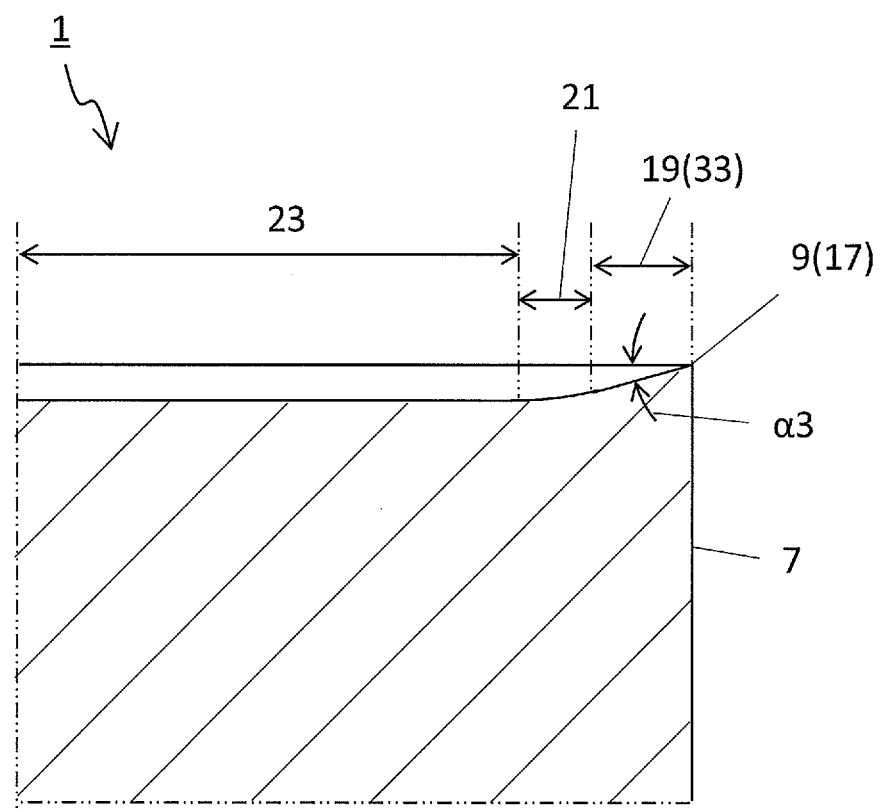
FIG. 7 is a cross-sectional view along a cross-section B3-B3 of the cutting insert illustrated in FIG. 4.
Figure 8:
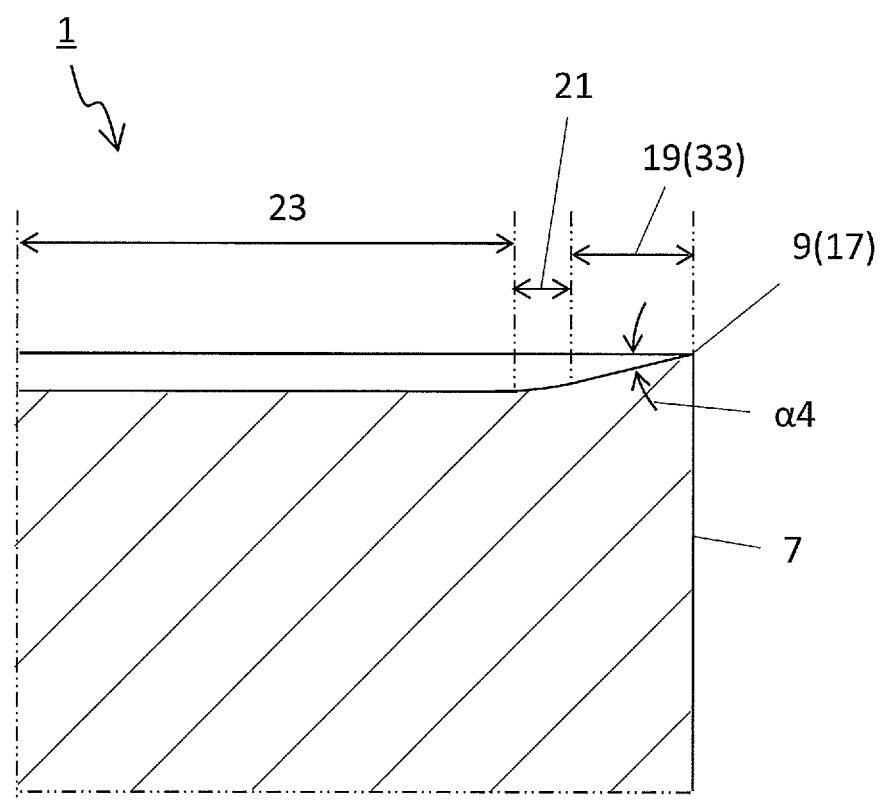
FIG. 8 is a cross-sectional view along a cross-section B4-B4 of the cutting insert illustrated in FIG. 4.

An inclination angle (rake angle) of the corner rake face 33 in the present embodiment increases as the corner rake face 33 separates from the region adjacent to the second inclined surface (second rake face) 31 and comes closer to the region adjacent to the first inclined surface (first rake face) 29. Specifically, as illustrated in FIGS. 7 and 8, a rake angle α3 of the corner rake face 33 in the region adjacent to the first rake face 29 is greater than a rake angle α4 of the corner rake face 33 in the region adjacent to the second rake face 31.

With the rake angle of the corner rake face 33 configured as described above, sudden changes in the rake angle of the rake face 19 are decreased from the first rake face 29 towards the second rake face 31. While chip clogging readily occurs due to sudden changes in rake angle, chips are less susceptible to clogging in the insert 1 in the present embodiment, making it possible to decrease cutting resistance and decrease wear of the rake face 19.

The flat surface 23 having a constant height from the bottom surface 5 is located on an inner side of the rake face 19 of the top surface 3. The flat surface 23, as illustrated in FIGS. 3 and 4, is disposed in a strip shape along the rake face 19 in a top view of the insert 1. Further, the rising surface 25 having an increasing height from the bottom surface 5 as a distance from the flat surface 23 increases is located on an inner side of the flat surface 23 of the top surface 3.

In other words, in the insert 1 in the present embodiment, the rising surface 25 is an inclined surface that inclines away from the bottom surface 5 as approaching the through-hole 11 decreases. The flat surface 23 and the rising surface 25 have the role of curling chips that have advanced thereto.

Figure 5:
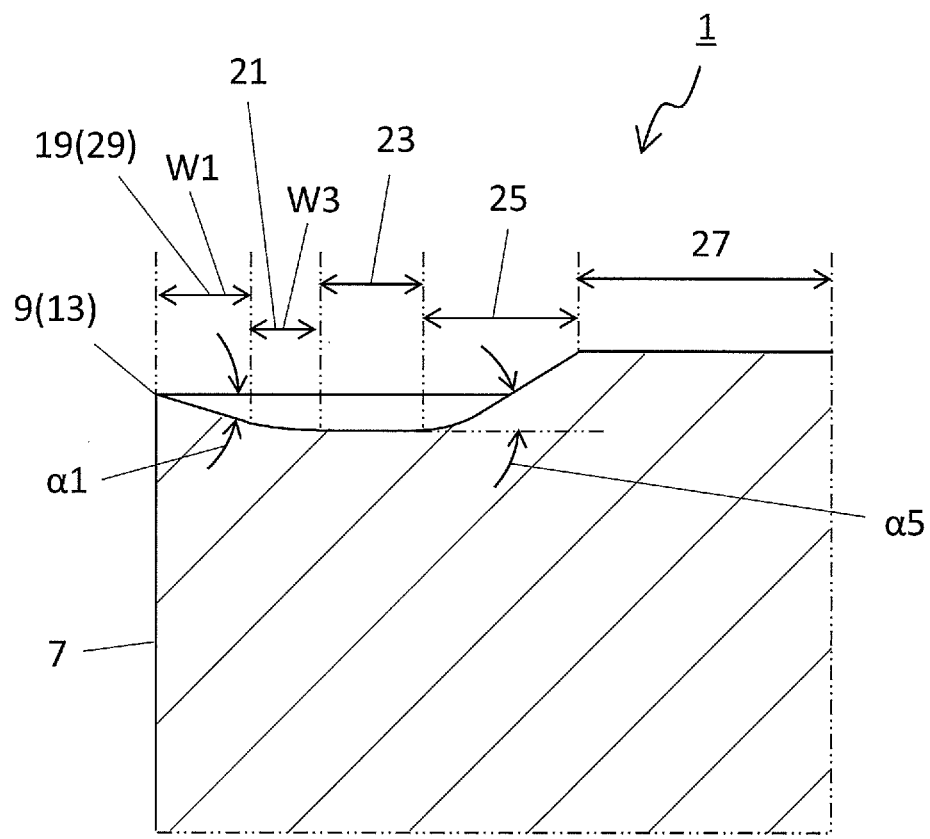
FIG. 5 is a cross-sectional view along a cross-section B1-B1 of the cutting insert illustrated in FIG. 4.
Figure 6:
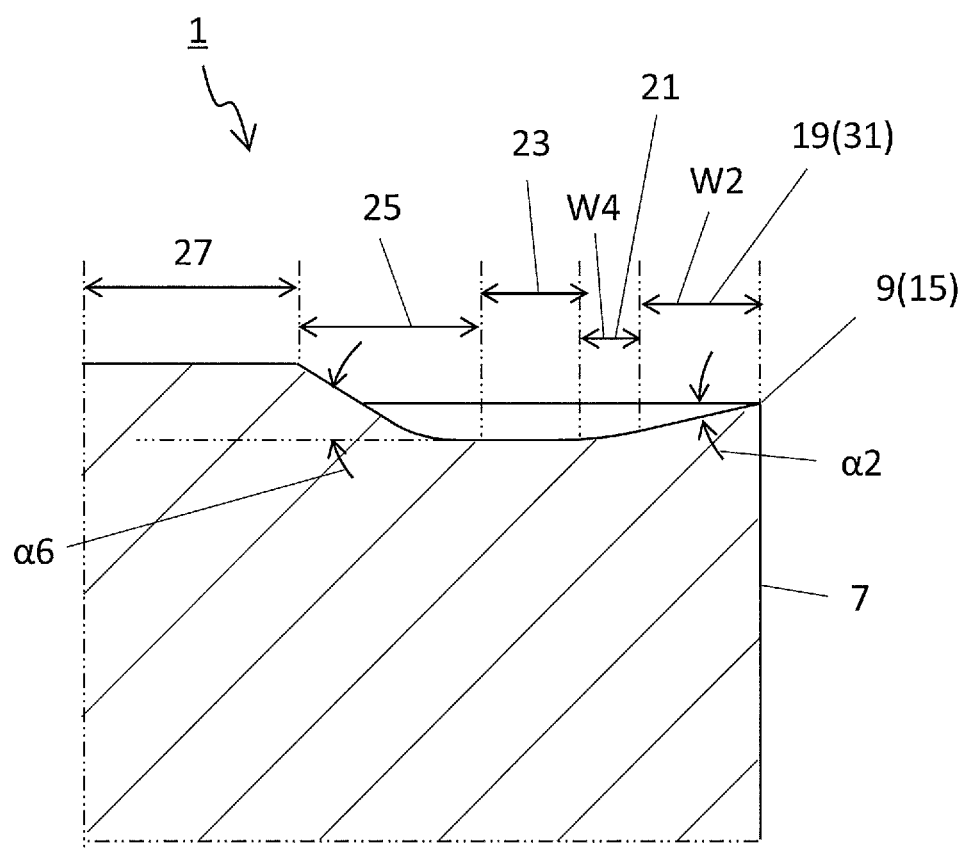
FIG. 6 is a cross-sectional view along a cross-section B2-B2 of the cutting insert illustrated in FIG. 4.

In the present embodiment, an inclination angle α5 of a region of the rising surface 25 that faces the first cutting edge 13 as illustrated in FIG. 5 is the same value as an inclination angle α6 of a region of the rising surface 25 that faces the second cutting edge 15 as illustrated in FIG. 6.

The flat main surface 27 orthogonal to the central axis O1 of the through-hole 11 is located on an inner side of the rising surface 25 of the top surface 3. When the cutting edge disposed on the ridge where the bottom surface 5 and the side surface 7 intersect is to be used, the insert 1 is mounted to the holder with the main surface 27 described above serving as a placement surface.

In the insert 1 of the present embodiment, the bottom surface 5 has a configuration similar to that of the top surface 3, and includes a flat surface corresponding to this main surface 27. Thus, when the cutting edge 9 disposed on the ridge where the top surface 3 and the side surface 7 intersect is to be used, the flat surface of the bottom surface 5 corresponding to the main surface 27 is the placement surface for the holder.

In the insert 1 of the present embodiment, the rising surface 25 and the main surface 27 have a shape that rises upward with the flat surface 23 serving as a reference. The rising surface 25 and the main surface 27 are located on the inner side of the flat surface 23, and a part of a raised portion formed by the rising surface 25 and the main surface 27 forms a protruding portion 35 protruding towards the corner cutting edge 17.

When such a protruding portion 35 is provided, the chips that advance towards the second rake face 31 come into contact with the protruding portion 35, causing the chips to slow down. This configuration makes it possible to decrease the possibility of strong chip collision into the second rake face 31.

At this time, in a top view of the insert 1, the protruding portion 35 is off-centered toward the side of the first cutting edge 13 with respect to a vertical bisecting line L of the corner cutting edge 17. When the protruding portion 35 is thus off-centered, it is possible to widely secure a region between the second cutting edge 15 and the protruding portion 35. This configuration makes it possible to further decrease the rake angle of the second rake face 31.

The connecting surface 21 is located between the rake face 19 and the flat surface 23 and connects these surfaces. The connecting surface 21 is smoothly connected to the rake face 19 and the flat surface 23. Here, "smoothly connected" means that there are no steps or bend points formed between the two surfaces. The connecting surface 21 has a concave curved surface shape in the cross section orthogonal to the cutting edge 9.

The top surface 3 in the present embodiment is a surface that includes the inclined surface 19, the connecting surface 21, the flat surface 23, the rising surface 25, the main surface 27, the protruding portion 35, and the like as described above.

When the first rake face 29 and the second rake face 31 each have a concave curved surface shape, a radius of curvature of the connecting surface 21 is set smaller than a radius of curvature of the first rake face 29 and the second rake face 31 in a cross section orthogonal to the cutting edge 9.

In the insert 1 in the present embodiment, a width W3 of the connecting surface 21 between the first rake face 29 and the flat surface 23 is greater than a width W4 of the connecting surface 21 between the second rake face 31 and the flat surface 23 in a top view of the insert 1. The rake angle α1 of the first rake face 29 is greater than the rake angle α2 of the second rake face 31. Thus, an angle of intersection of the first rake face 29 and the flat surface 23 is greater than an angle of intersection of the second rake face 31 and the flat surface 23. In such a case, the direction of advancement of the chips that advance from the first rake face 29 to the flat surface 23 varies significantly.

Nevertheless, in the insert 1 of the present embodiment, the width W3 of the connecting surface 21 between the first rake face 29 and the flat surface 23 is relatively large. Thus, sudden changes in the direction of advancement of the chips advancing from the first rake face 29 to the flat surface 23 are decreased. That is, it is possible to smoothly connect the first rake face 29 and the flat surface 23, and achieve a smooth chip flow from the first rake face 29 to the flat surface 23.

The chips that flow to the flat surface 23 smoothly come into contact with the flat surface 23, thereby decreasing the speed of advancement. As a result, collision of chips into the protruding portion 35 at an excessively high speed is avoided, thereby decreasing chip clogging.

Note that "located on an inner side" of the rake face 19, the rising face 25, and the flat surface 23 means located closer to the central axis O1. Further, when the bottom surface 5 is not a flat surface, making assessment of the height from the bottom surface 5 difficult, assessment may be made using the height from an imaginary plane orthogonal to the central axis O1 rather than the height from the bottom surface 5.

Further, while not particularly illustrated, between the flat surface 23 and the rising surface 25 as well as between the rising surface 25 and the main surface 27 there is each disposed a surface that smoothly connects these surfaces, similar to the connecting surface 21 described above. With these surfaces, it is possible to achieve a smooth chip flow.

Cutting Tool

Next, description will be given of a cutting tool 101 of one embodiment using drawings.

Figure 9:
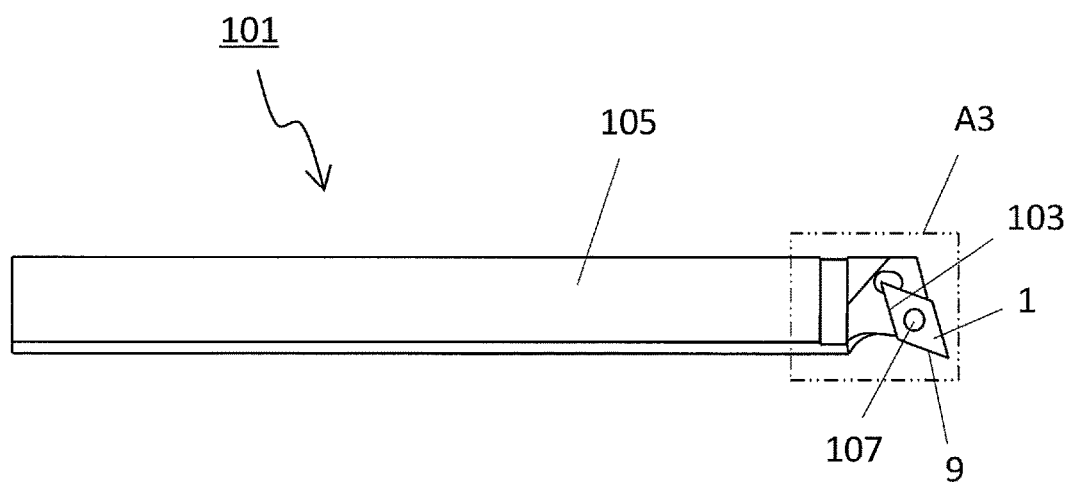
FIG. 9 is a top view illustrating a cutting tool of one embodiment of the present invention.
Figure 10:
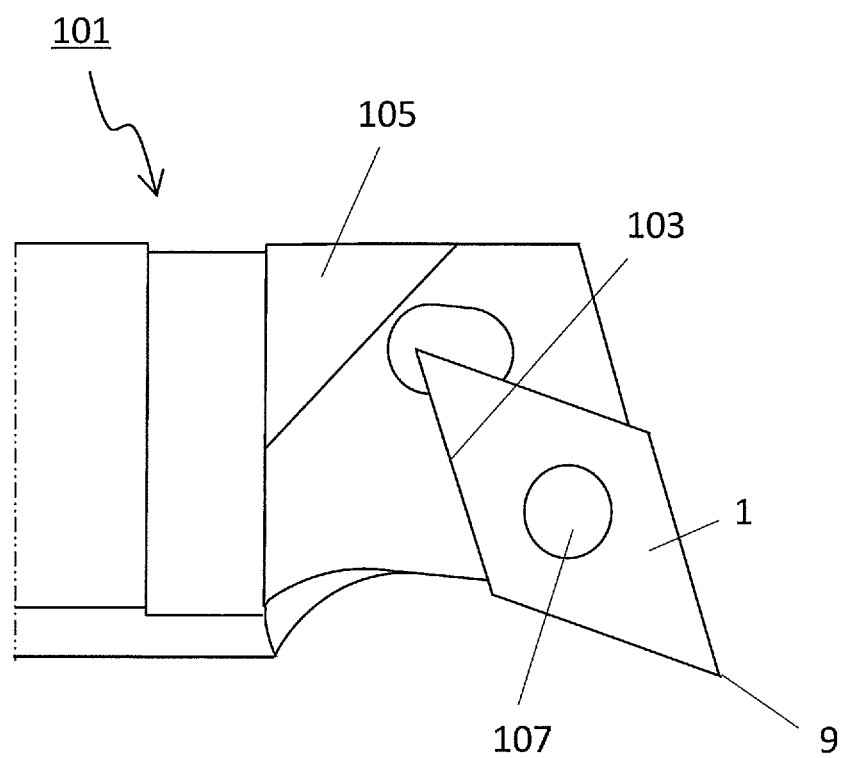
FIG. 10 is an enlarged top view of a region A3 of the cutting tool illustrated in FIG. 9.

The cutting tool 101 in the present embodiment is provided with a holder 105 and the above-described cutting insert 1. The holder 105 includes an insert pocket 103 on a tip side. The cutting insert 1 is configured to be mounted to the insert pocket 103 with the cutting edge 9 protruding from the tip of the holder 105, as illustrated in FIGS. 9 and 10.

The holder 105 forms a long and slender rod shape. Then, the tip side of the holder 105 is provided with one insert pocket 103. The insert pocket 103 is a portion on which the insert 1 is mounted, and is opened to a tip surface of the holder 105. At this time, the insert pocket 103 is opened to a side surface of the holder 105, making it possible to easily mount the insert 1. Specifically, the insert pocket 103 includes a seating face and a binding side face. The seating face is parallel to a bottom surface of the holder 105. The binding side face inclines with respect to the seating face.

The insert 1 is configured to be mounted to the insert pocket 103. The insert 1 is mounted with the cutting edge 9 protruding to the tip side of the holder 105. In the present embodiment, the insert 1 is mounted to the holder 105 using a fixing screw 107. That is, the insert 1 is mounted to the holder 105 by inserting the fixing screw 107 into a through-hole of the insert 1, inserting a tip of this fixing screw 107 into a screw hole provided to the insert pocket 103, and screwing thread portions thereof.

For the holder 105, it is possible to use steel, cast iron, or the like. In particular, it may preferable to use steel with a high toughness in these members.

Method for Manufacturing a Machined product

Next, description will be given of a method for manufacturing a machined product of one embodiment using drawings.

The machined product is manufactured by carrying out cut processing on a work material 201. The method for manufacturing a machined product in the present embodiment is provided with the following steps. That is, the present embodiment includes:

(1) Rotating the work material 201, (2) Bringing the cutting edge of the cutting tool 101 represented in the embodiment described above into contact with the work material 201 that is rotating, and (3) Separating the cutting tool 101 from the work material 201.

Figure 11:
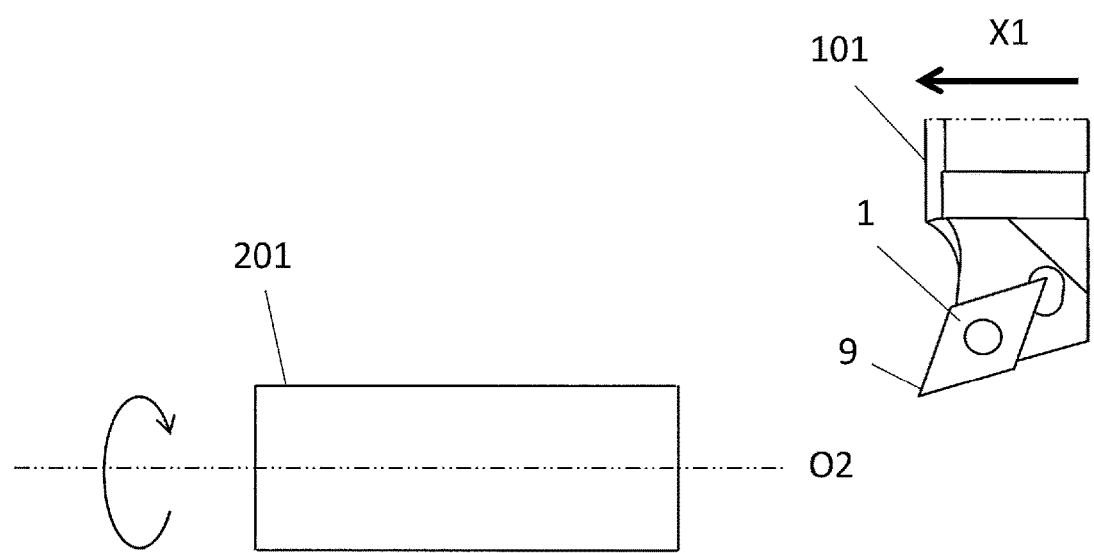
FIG. 11 is a schematic view illustrating one step of the method for manufacturing a machined product of one embodiment.
Figure 12:
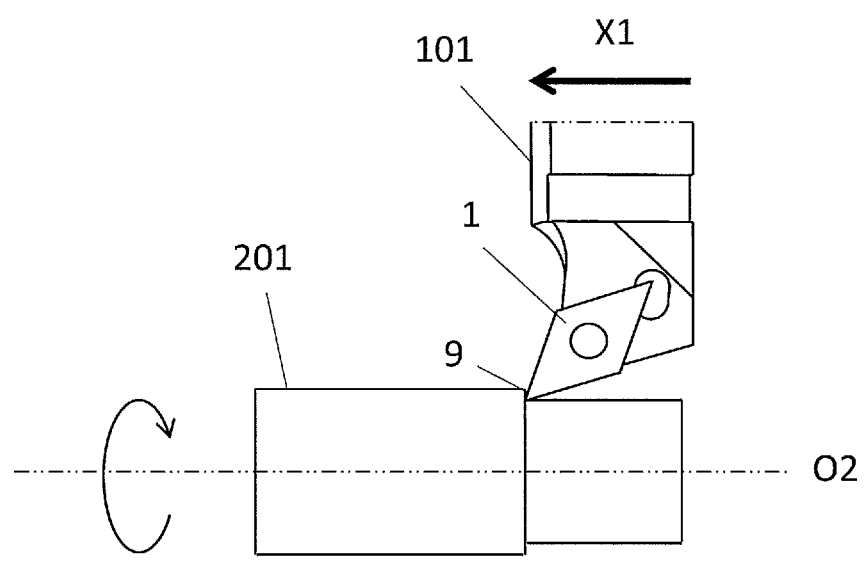
FIG. 12 is a schematic view illustrating one step of the method for manufacturing a machined product of one embodiment.
Figure 13:
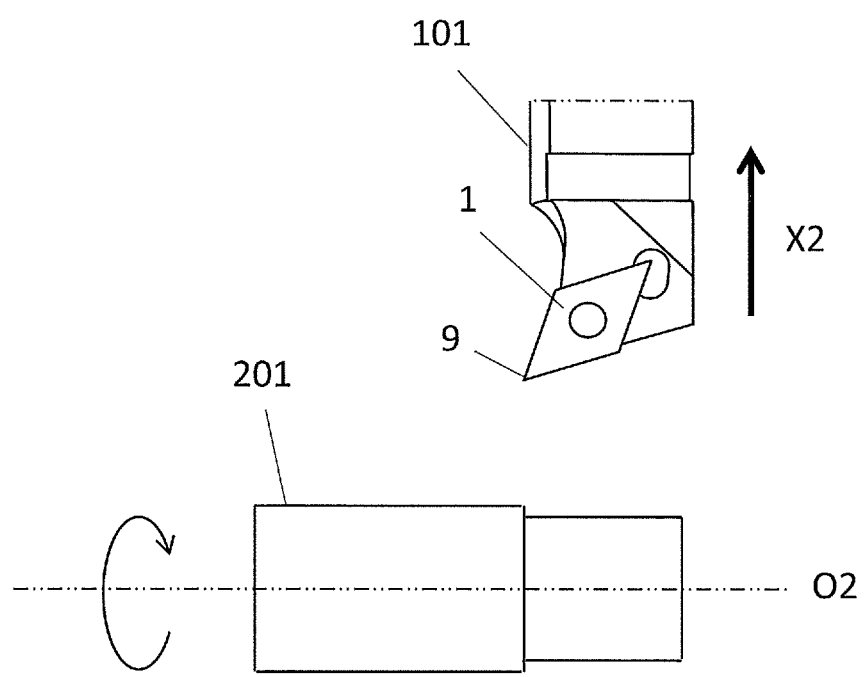
FIG. 13 is a schematic view illustrating one step of the method for manufacturing a machined product of one embodiment.

More specifically, first, as illustrated in FIG. 11, the work material 201 is made to rotate about an axis O2, and the cutting tool 101 is brought relatively near the work material 201. Next, as illustrated in FIG. 12, the cutting edge 9 of the cutting tool 101 is brought into contact with the work material 201 to cut the work material 201. Then, as illustrated in FIG. 13, the cutting tool 101 is relatively moved away from the work material 201.

In the present embodiment, the cutting tool 101 is brought close to the work material 201 by being moved in the direction X1 with the axis O2 fixed and the work material 201 rotating. Further, in FIG. 12, the work material 201 is cut by making the cutting edge 9 of the cutting insert 1 come into contact with the work material 201 that is rotating. Further, in FIG. 13, the cutting tool 101 is moved away from the work material 201 by being moved in the direction X2 with the work material 201 rotating.

Here, in the cut processing in the manufacturing method of the present embodiment, in each of these steps, the cutting tool 101 is brought into contact with or separated from the work material 201 by being moved; however, these steps are of course not limited thereto.

For example, in step (1), the work material 201 may be brought close to the cutting tool 101. In the same manner, in step (3), the work material 201 may be moved away from the cutting tool 101. In a case where the cut processing is to be continued, steps of bringing the cutting edge 9 of the cutting insert 1 into contact with different places on the work material 201 may be repeated by maintaining the rotating state of the cutting tool 201.

Here, representative examples of the material of the work material 201 include carbon steel, alloy steel, stainless steel, cast iron, non-ferrous metals, or the like.

REFERENCE SIGNS LIST

1 Cutting insert (insert)
3 Top surface
3a First side
3b Second side
3c Corner portion
5 Bottom surface
7 Side surface
9 Cutting edge
11 Through-hole
13 First cutting edge
15 Second cutting edge
17 Corner cutting edge
19 Inclined surface (rake face)
21 Connecting surface
23 Flat surface
25 Rising surface
27 Main surface
29 First inclined surface (first rake face)
31 Second inclined surface (second rake face)
33 Third inclined surface (corner rake face)
35 Protruding portion
101 Cutting tool
103 Insert pocket
105 Holder
107 Screw
201 Work material

The invention claimed is:

1. A cutting insert comprising:
   a top surface having a polygonal shape, and comprising:
      a corner portion,
      a first side and a second side, each extending from the corner portion;
   a bottom surface;
   a side surface located between the top surface and the bottom surface; and
   a cutting edge located at an intersecting part of the top surface and the side surface;
   wherein the cutting edge comprises
      a corner cutting edge located at the intersecting part corresponding to the corner portion; and
      a first cutting edge located at the intersecting part corresponding to the first side,
   wherein the top surface comprises an inclined surface comprising:
      a first inclined surface being flat and along the first side;
      a second inclined surface being flat and along the second side; and
      a third inclined surface-along the corner portion;
      a flat surface located on an inner side of the inclined surface; and
      a connecting surface, having a curved surface shape, and located between the inclined surface and the flat surface, and
   wherein a width of the connecting surface between the first inclined surface and the flat surface is greater than a width of the connecting surface between the second inclined surface and the flat surface in a top view of the cutting insert, and
   wherein an inclination angle of the first inclined surface is greater than an inclination angle of the second inclined surface.

2. The cutting insert according to claim 1, wherein a width of the second inclined surface in a direction orthogonal to the second side is greater than a width of the first inclined surface in a direction orthogonal to the first side in a top view of the cutting insert.

3. The cutting insert according to claim 1, wherein
   the top surface further comprises a protruding portion:
   located on an inner side of the flat surface; and
   protruding towards the corner cutting edge, and
   the protruding portion is off-centered toward a side of the first cutting edge with respect to a vertical bisecting line of the corner cutting edge in a top view of the cutting insert.

4. The cutting insert according to claim 1, wherein an inclination angle of the third inclined surface increases as approaching from a region adjacent to the second inclined surface to a region adjacent to the first inclined surface.

5. A cutting tool comprising:
   a holder comprising an insert pocket on a tip side thereof; and the cutting insert according to claim 1, configured to be mounted to the insert pocket with the cutting edge protruding from a tip of the holder.

6. A method for manufacturing a machined product, the method comprising:
rotating a work material;
bringing the cutting edge of the cutting tool according to claim 5 into contact with the work material that is rotating; and
separating the cutting tool from the work material.

7. A cutting insert comprising:
a top surface having a polygonal shape, and comprising:
a corner portion,
a first side and a second side, each extending from the corner portion;
a bottom surface;
a side surface located between the top surface and the bottom surface; and
a cutting edge located at an intersecting part of the top surface and the side surface;
wherein the cutting edge comprises
a corner cutting edge located at the intersecting part corresponding to the corner portion; and
a first cutting edge located at the intersecting part corresponding to the first side,
wherein the top surface comprises an inclined surface comprising:
a first inclined surface along the first side;
a second inclined surface along the second side; and
a third inclined surface along the corner portion,
wherein the first inclined surface is in contact with the intersecting part and inclined downward going away from the first side,
wherein the second inclined surface is in contact with the intersecting part and inclined downward going away from the second side, and
wherein an inclination angle of the first inclined surface is greater than an inclination angle of the second inclined surface.

8. The cutting insert according to claim 7, wherein the first inclined surface and the second inclined surface are flat.

9. The cutting insert according to claim 8, wherein a width of the second inclined surface in a direction orthogonal to the second side is greater than a width of the first inclined surface in a direction orthogonal to the first side in a top view of the cutting insert.

10. The cutting insert according to claim 8,
wherein the top surface further comprises:
a flat surface located on an inner side of the inclined surface; and
a connecting surface, having a curved surface shape, and located between the inclined surface and the flat surface, and
wherein a width of the connecting surface between the first inclined surface and the flat surface is greater than a width of the connecting surface between the second inclined surface and the flat surface in a top view of the cutting insert.

11. The cutting insert according to claim 10, wherein
the top surface further comprises a protruding portion:
located on an inner side of the flat surface; and
protruding towards the corner cutting edge, and
the protruding portion is off-centered toward a side of the first cutting edge with respect to a vertical bisecting line of the corner cutting edge in a top view of the cutting insert.

12. The cutting insert according to claim 7, wherein an inclination angle of the third inclined surface increases as approaching from a region adjacent to the second inclined surface to a region adjacent to the first inclined surface.

13. A cutting tool comprising:
a holder comprising an insert pocket on a tip side thereof; and
the cutting insert according to claim 7, configured to be mounted to the insert pocket with the cutting edge protruding from a tip of the holder.

14. A method for manufacturing a machined product, the method comprising:
rotating a work material;
bringing the cutting edge of the cutting tool according to claim 13 into contact with the work material that is rotating; and
separating the cutting tool from the work material.

* * * * *